(12) United States Patent (10) Patent No.: US 12,562,442 B2
Zhao et al. (45) Date of Patent: Feb. 24, 2026

---

(54) LID PLATE AND BATTERY

(71) Applicant: EVE POWER CO., LTD., Hubei (CN)

(72) Inventors: Fenfen Zhao, Hubei (CN); Haixu Lu, Hubei (CN); Lei Zhang, Hubei (CN); He Zhao, Hubei (CN); Liming Huang, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 599 days.

(21) Appl. No.: 18/003,333

(22) PCT Filed: Nov. 4, 2022

(86) PCT No.: PCT/CN2022/129942
§ 371 (c)(1),
(2) Date: Dec. 26, 2022

(87) PCT Pub. No.: WO2024/050953
PCT Pub. Date: Mar. 14, 2024

(65) Prior Publication Data
US 2024/0304962 A1 Sep. 12, 2024

(30) Foreign Application Priority Data

Sep. 9, 2022 (CN) .......................... 202211104996.1
Sep. 9, 2022 (CN) .......................... 202222404270.1

(51) Int. Cl.
H01M 50/583 (2021.01)
H01M 50/152 (2021.01)
(Continued)

(52) U.S. Cl.
CPC ....... H01M 50/583 (2021.01); H01M 50/152 (2021.01); H01M 50/16 (2021.01);
(Continued)

(58) Field of Classification Search
CPC .. H01M 50/583; H01M 50/152; H01M 50/16; H01M 50/213; H01M 50/533; H01M 50/581; H01M 50/147; H01M 2200/103
See application file for complete search history.

(56) References Cited

U.S. PATENT DOCUMENTS

2014/0087226 A1* 3/2014 Mishiro .............. H01M 50/528
429/94
2021/0305544 A1* 9/2021 Miloaga .............. H01M 50/293
2024/0072343 A1* 2/2024 Huang ................ H01M 50/545

FOREIGN PATENT DOCUMENTS

CN 203574017 U * 4/2014
CN 205666262 U 10/2016
(Continued)

OTHER PUBLICATIONS

English Translation of CN 215816080 U—Top Cover Assembly for Battery, Battery and Energy Storage Device; New Energy Technology Co Ltd; Feb. 11, 2022 (Year: 2022).*
(Continued)

*Primary Examiner* — Adam J Francis
(74) *Attorney, Agent, or Firm* — PV IP PC; Wei Te Chung

(57) ABSTRACT

A lid plate and a battery are provided by the present application. The lid plate includes a top lid, a lower plastic and a current collecting disk. The top lid is stacked with the lower plastic. An accommodating space is defined on a side of the lower plastic away from the top lid. Supporting protrusions are provided in the accommodating space. The supporting protrusions are configured to defined a limiting space. The current collecting disk includes the current collecting disk main body and the fuse structure. The fuse structure includes a first part and a second part. The first part is electrically connected to the top lid through the lower plastic, the second part is connected to the current collecting
(Continued)

disk main body. The current collecting disk main body is located outside the limiting space and abuts against the supporting protrusions.

17 Claims, 3 Drawing Sheets

(51) Int. Cl.
  *H01M 50/16*        (2021.01)
  *H01M 50/213*       (2021.01)
  *H01M 50/533*       (2021.01)
(52) U.S. Cl.
  CPC ....... *H01M 50/213* (2021.01); *H01M 50/533* (2021.01); *H01M 2200/103* (2013.01)

(56)                References Cited

FOREIGN PATENT DOCUMENTS

| CN | 213583958 | U | | 6/2021 | |
| CN | 215578775 | U | * | 1/2022 | .......... H01M 50/152 |
| CN | 215816080 | U | * | 2/2022 | |

OTHER PUBLICATIONS

International Search Report in International application No. PCT/CN2022/129942, mailed on May 10, 2023.
Written Opinion of the International Search Authority in International application No. PCT/CN2022/129942, mailed on May 10, 2023.

* cited by examiner

LID PLATE AND BATTERY

CROSS REFERENCE TO RELATED APPLICATIONS

This disclosure claims priority benefits to Chinese Patent Applications No. 202211104996.1 and No. 202222404270.1 both filed Sep. 9, 2022. The contents of all of the aforementioned applications, including any intervening amendments thereto, are incorporated herein by reference.

TECHNICAL FIELD

The present application relates to the technical field of batteries, and in particular relates to a lid plate and a battery.

BACKGROUND

A lid plate includes a top lid, a lower plastic and a current collecting disk. The current collecting disk is fixed on the lower plastic and is electrically connected with a tab and the top lid. A battery may explode or catch fire due to abnormal conditions such as excessive current during a charge-discharge process. A fuse structure is disposed on the current collecting disk, so that when internal pressure and/or current of a battery cell increase sharply under abnormal use conditions, the fuse structure disposed on the current collecting disk can be quickly fused, thereby quickly cutting off a circuit. However, when the current collecting disk is connected to the tab and the top lid, the fuse structure disposed on the current collecting disk is in a bending state. After the fuse structure is fused, it is prone to adhesion to the current collecting disk due to its own structure, so that the current collecting disk is still in a state of electrical conduction, resulting in fused failure of the fuse structure, it cannot play its due role in safety protection.

SUMMARY

A lid plate is provided by the present application, which can effectively avoid a problem that a fuse structure still adhesion after fusing, so as to ensure safety of a battery.

In the first aspect, a lid plate is provided in embodiments of the present application, and includes:

a top lid;

a lower plastic, the lower plastic is stacked with the top lid, an accommodating space is defined on a side of the lower plastic away from the top lid, supporting protrusions are arranged in the accommodating space, and the supporting protrusions are configured to define a limiting space; and a current collecting disk located in the accommodating space, wherein the current collecting disk includes a current collecting disk main body and a fuse structure, the fuse structure includes a first part and a second part, the first part and the second part are both located in the limiting space, the first part passes through the lower plastic to be electrically connected to the top lid, the second part is connected to the current collecting disk main body, the current collecting disk main body is located outside the limiting space and abuts against the supporting protrusions, and the first part, the second part and the current collecting disk main body are spaced apart from each other along a height direction of the supporting protrusions.

In an embodiment, the lower plastic includes an adapting part, the adapting part is located in the limiting space, and the first part is inserted into the adapting part.

In an embodiment, the adapting part is injection molded separately from the lower plastic.

In an embodiment, the lower plastic includes a bottom plate and a side plate, the side plate is arranged around a circumference of the bottom plate to define the accommodating space, and the supporting protrusions are connected to at least one of the bottom plate and the side plate.

In an embodiment, the supporting protrusions include protruding parts and fixing parts, the protruding parts and the bottom plate are configured to define the limiting space, and the protruding parts are connected to the side plate through the fixing parts.

In an embodiment, the side plate is provided with an avoidance part, and the fuse structure passes through the avoidance part and extends into the limiting space.

In an embodiment, the supporting protrusions include two group, two groups of supporting protrusions are respectively located on both sides of the avoidance part, and the fuse structure is located between the two groups of supporting protrusions.

In an embodiment, each group of the two groups of supporting protrusions includes a plurality of supporting sub-protrusions, and the plurality of supporting sub-protrusions are arranged at intervals along a circumferential direction of the bottom plate.

In an embodiment, a connecting hole is defined on the bottom plate, the first part is provided with a connecting protrusion, and the connecting protrusion is inserted into the connecting hole and welded to the top lid.

In an embodiment, a height of the limiting space is defined as a, and a sum of thicknesses of the first part and the second part is defined as b along a thickness direction of the lower plastic, and a>2b.

In an embodiment, the height of the limiting space is defined as a, a sum of thicknesses of the first part, the second part, and the adapting part between the first part and the second part is defined as c along the thickness direction of the lower plastic, and a>c and c<2b.

In an embodiment, the fuse structure further includes a bendable part, and the first part and the second part are bently connected through the bendable part.

A battery is provided by the present application, which has great product safety.

In the second aspect, the battery is provided in embodiments of the present application, and includes a housing with an opening defined on at least one end, battery cells accommodated in the housing, and the above-mentioned lid plate; the lid plate is configured to seal the opening of the housing, and the battery cells are connected with the current collecting disk in the lid plate.

The lid plate is provided by the present application including the top lid, the lower plastic and the current collecting disk. The top lid is stacked with the lower plastic. The accommodating space is defined on the side of the lower plastic away from the top lid. The current collecting disk is located in the accommodating space and are respectively electrically connected to the top lid and the battery cell. In addition, the supporting protrusions are provided in the accommodating space. The supporting protrusions are configured to defined the limiting space. The current collecting disk includes the current collecting disk main body and the fuse structure. The fuse structure includes a first part and a second part. The first part passes through the lower plastic to be electrically connected to the top lid, the second part is connected to the current collecting disk main body. The current collecting disk main body is located outside the limiting space and abuts against the supporting protrusions. By setting the supporting protrusions, the battery can be prevented from the reduction in installation space of the fuse structure caused by the compression of the current collecting disk main body due to the vibration of the battery. The lid plate can effectively solve a problem that adhesion may occur even if the fuse structure is blown, so that the current collecting disk main body is still in a conductive state, ensuring safety in use of the battery.

The battery is provided by the present application, and includes the above-mentioned lid plate, which can avoid the problem of adhesion of the fuse structure after fusing, thereby ensuring the safe in use of the battery.

Figure 1:
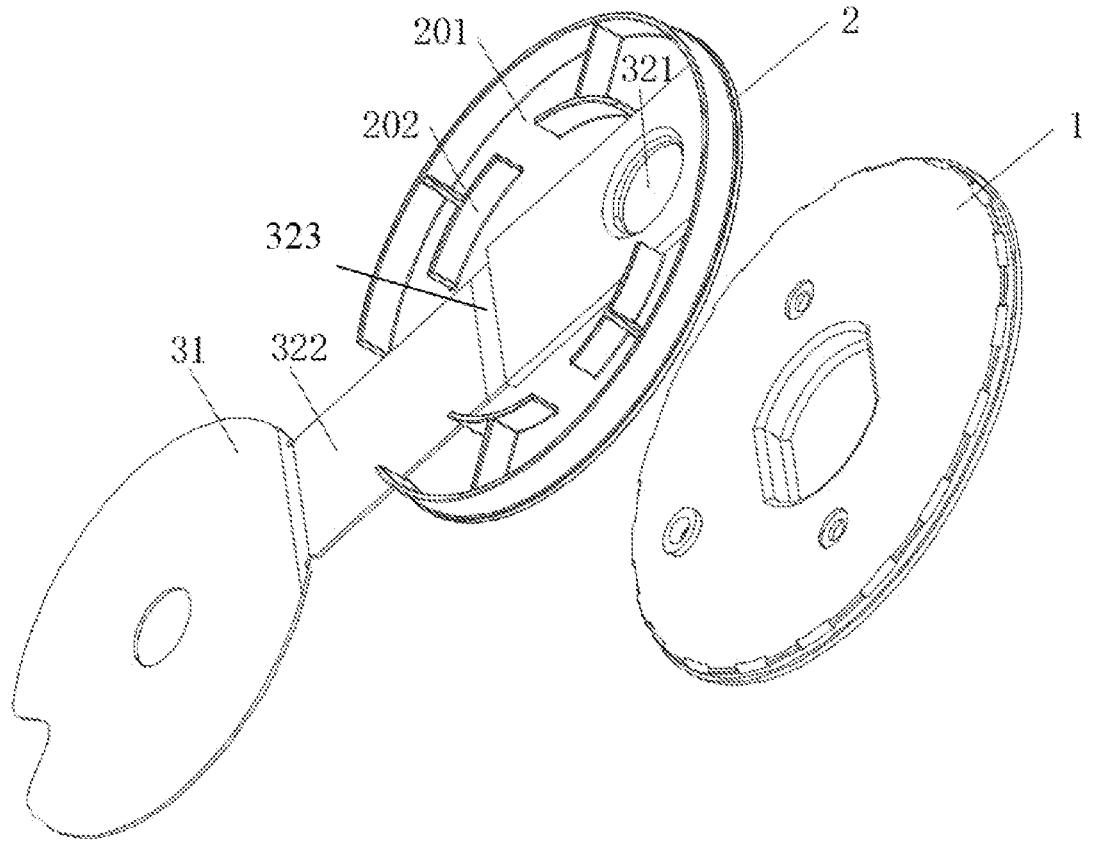
FIG. 1 is an exploded view of a first viewing angle of a lid plate provided by an embodiment of the present application.
Figure 2:
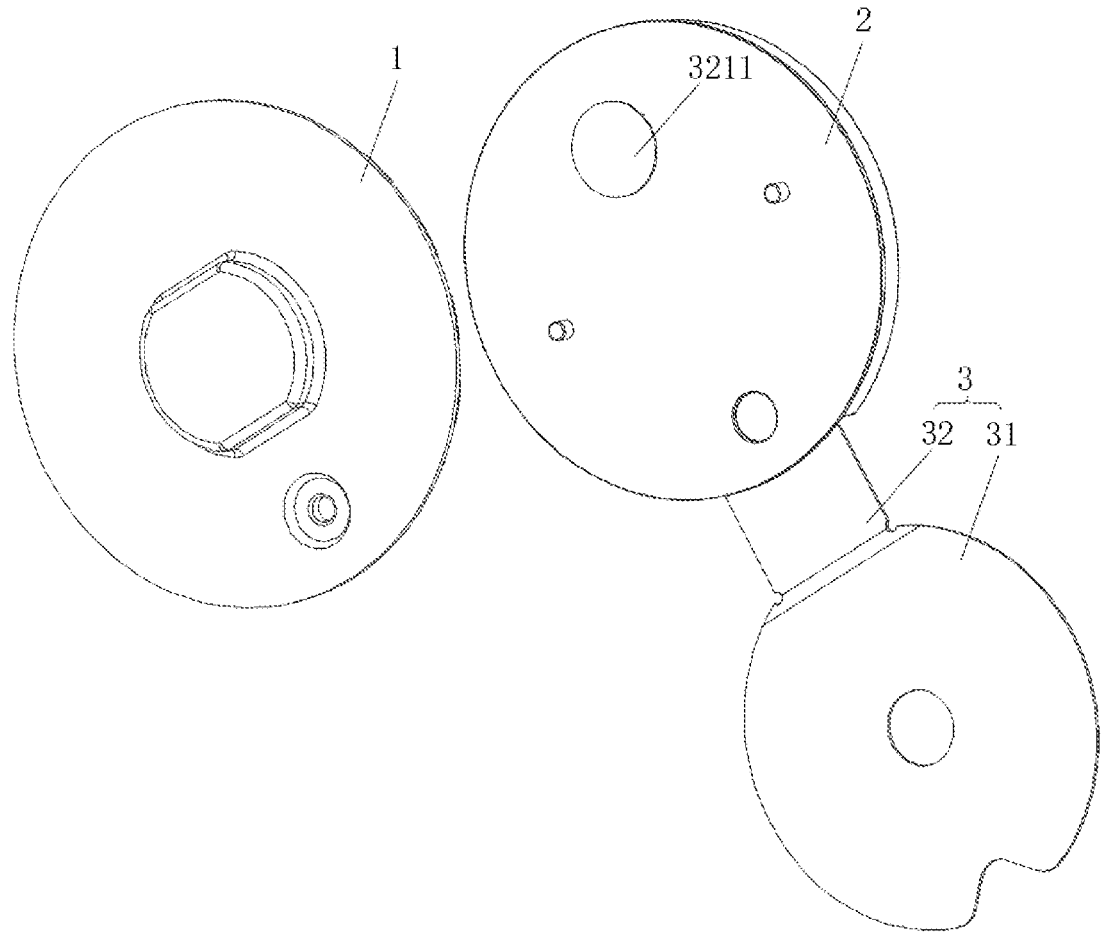
FIG. 2 is an exploded view of a second viewing angle of the lid plate provided by an embodiment of the present application.
Figure 3:
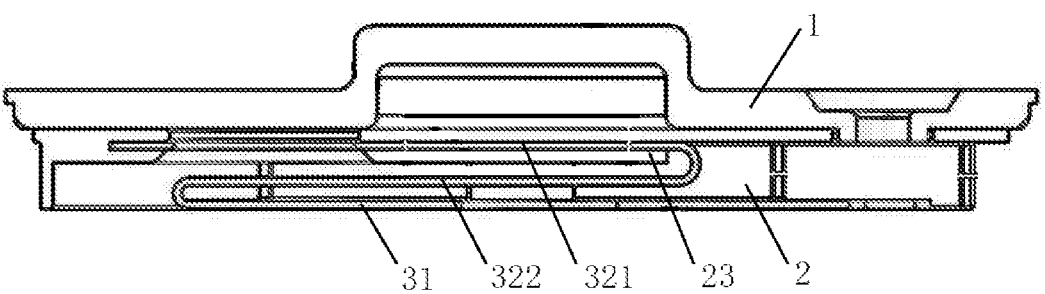
FIG. 3 is a sectional view of the lid plate provided by an embodiment of the present application.

In the above figures:
1. Top lid.
2. Lower plastic; 21. bottom plate; 211. connecting hole; 212. liquid injecting hole; 22. side plate; 221. avoidance part; 23, adapting part; 24. supporting protrusion; 241. protruding part; 242. fixing part; 201. accommodating space; 202. limiting space. 3. Current collecting disk; 31. current collecting disk main body; 32. fuse structure; 321. first part; 3211. connecting protrusion; 322. second part; 323. bendable part.

DETAILED DECRYPTION OF THE EMBODIMENTS

In description of the present disclosure, unless otherwise specified and defined, terms "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present disclosure can be understood according to situations.

In the present disclosure, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "above" or "up" the second feature includes that the first feature is directly above or obliquely above the second feature, or only indicate that a horizontal height of the first feature is greater than a horizontal height of the second feature. That the first feature is disposed "below", "under", or "underneath" of the second feature include that the first feature is directly below or obliquely below the second feature, or only indicate that the horizontal height of the first feature is less than the horizontal height of the second feature.

In the description of this embodiment, terms indicating orientation or location relationships such as "up", "down", "left", and "right" are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present disclosure. In addition, terms "first" and "second" are only used to distinguish in terms of description and have no special meanings.

As shown in FIGS. 1 to 6, a lid plate is provided in an embodiment, and includes a top lid 1, a lower plastic 2 and a current collecting disk 3. The top lid 1 is stacked with the lower plastic 2. An accommodating space 201 is defined on a first side of the lower plastic 2 away from the top lid 1. The current collecting disk 3 is located in the accommodating space 201 and is electrically connected to the top lid 1 and a battery cell respectively. The current collecting disk 3 includes a current collecting disk main body 31 and a fuse structure 32. A first end of the fuse structure 32 is connected to the current collecting disk main body 31. A second end of the fuse structure 32 passes through the plastic 2 and is connected to the top lid 1 located at a second side of the lower plastic 2. The fuse structure 32 is a part of the current collecting disk 3, and a cross-sectional area of the fuse structure 32 is much smaller than the current collecting disk main body 31. Therefore, when internal pressure and current of a battery increase sharply, the fuse structure 32 can be quickly fused to ensure the safety of the battery. However, as volumetric energy density of the battery continues to increase, an installation space of the current collecting disk 3 is compressed. When the fuse structure 32 is bent so that the current collecting disk 3 is located in the accommodating space 201 of the lower plastic 2, a first part and a second part of the fuse structure 32 are arranged in parallel with a small distance therebetween. Sticking may occur even if the fuse structure 32 is fused in this case. For example, in the case of battery vibration, or because a distance between two end of the fuse structure 32 fused is small, an arc will still be formed under high temperature conditions, so that the current collecting disk 3 is still in a conductive state.

In order to avoid this problem, the lid plate is provided in an embodiment provided with supporting protrusions 24 in the accommodating space 201 of the lower plastic 2. The supporting protrusions 24 are configured to define a limiting space 202. When the fuse structure 32 is bent to the current collecting disk 3 is located in the accommodating space 201, the first part 321 and the second part 322 of the fuse structure 32 are both located in the limiting space 202. The first part 321 is electrically connected to the top lid 1 through the lower plastic 2. The second part 322 is connected to the current collecting disk main body 31. The current collecting disk main body 31 is located outside the limiting space 202 and abuts against the supporting protrusion 24. The current collecting disk main body 31 is connected to a battery cell of the battery. When the battery is subjected to vibration, the current collecting disk main body 31 extruded the fuse structure arranged on the battery cell, it can be prevent the first part 321 and the second part 322 of the fuse structure 32 having been bent from approaching each other by providing the supporting protrusions 24. That is, the setting of the supporting protrusions 24 can effectively ensure that the first part 321 and the second part 322 of the fuse structure 32 will not be squeezed together, thereby affecting the fusing effect of the fuse structure 32.

In an embodiment, the fuse structure 32 further includes a bendable part 323, that is, the first part 321 and the second part 322 are bently connected through the bendable part 323. When two ends of the bendable part 323 gradually approach, that is the bendable part 323 being bent, the first part 321 and the second part 322 will approach each other. When the bendable part 323 is not bent, the first part 321, the bendable part 323 and the second part 322 will be on a same plane, that is, a shape of the fuse structure 32 in FIG. 1.

In an embodiment, the lower plastic 2 also includes an adapting part 23. The adapting part 23 is located in the limiting space 202. The first part 321 of the fuse structure 32 is inserted in the adapting part 23. That is, the adapting part 23 is covered on an outside of the first part 321, which can avoid contact between the first part 321 and the second part 322. The adapting part 23 is a part of the lower plastic 2, and the adapting part 23 is also made of plastic material, which can play a role of insulation.

In an embodiment, the lower plastic 2 that does not include the adapting part 23 is injected first, then the first part 321 is placed at a predetermined position, and then the first part 321 is wrapped by an injection molding process to form the adapting part 23. That is, the adapting part 23 and the lower plastic 2 are injection molded separately. The lower plastic 2 with the adapting part 23 can reduce a height of the limiting space 202 to increase the volumetric energy density of the battery.

In an embodiment, in order to ensure that the limiting space 202 defined by the supporting protrusions 24 can give sufficient installation space to the fuse structure 32, a height of the limiting space 202 is defined as a, sum of thicknesses of the first part 321 and the second part 322 is defined as b along a thickness direction of the lower plastic 2 in an embodiment, and a>2b.

In an embodiment, the lower plastic 2 includes the adapting part 23. The height of the limiting space 202 is defined as a, sum of the first part 321, the second part 322 and the adapting part 23 between the first part 321 and the second parts 322 is defined as c along the thickness direction of the lower plastic 2, where a>c and c<2b. Effective fusing of the fuse structure 32 can be guaranteed and the height of the limiting space 202 can be compressed by setting the adapting part 23. If the height of the limiting space 202 is large enough, the adapting part 23 can provide double insurance for the effective fusing of the fuse structure 32.

In an embodiment, the lower plastic 2 includes a bottom plate 21 and a side plate 22. The side plate 22 is arranged around circumference of bottom plate 21 to define accommodating space 201. The supporting protrusions 24 are fixed on at least one of the bottom plate 21 and the side plate 22. That is, there are three ways to fix the support protrusions 24. First supporting protrusions 24 are only fixedly connected to the bottom plate 21. Second supporting protrusions 24 are both fixedly connected to the side plate 22. Third supporting protrusions 24 are fixedly connected to the bottom plate 21 and the side plate 22 simultaneously.

Figure 4:
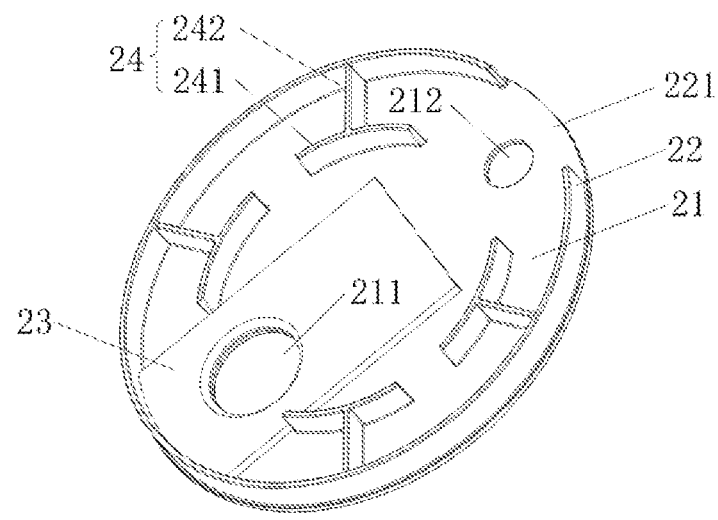
FIG. 4 is a schematic structural diagram of the first viewing angle of a lower plastic provided by an embodiment of the present application.
Figure 5:
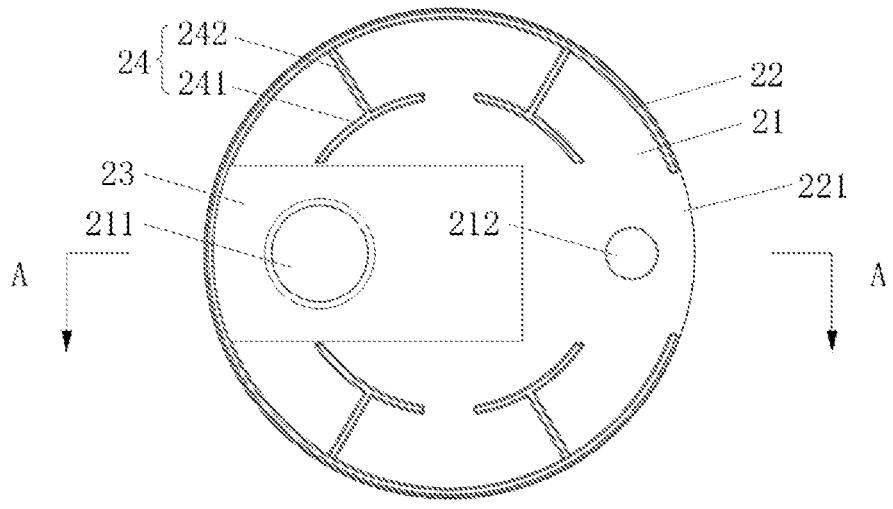
FIG. 5 is a schematic structural diagram of the second viewing angle of the lower plastic provided by an embodiment of the present application.
Figure 6:
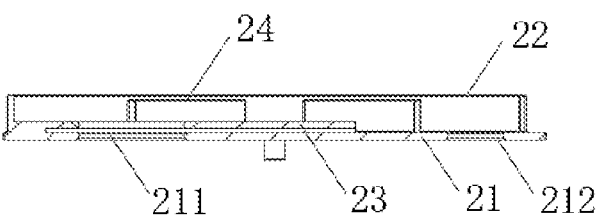
FIG. 6 is a sectional view of an A-A place among FIG. 5.

In an embodiment, the supporting protrusions 24 include protruding parts 241 and fixing part 242. The protruding parts 241 and the bottom plate 21 are configured to define the limiting space 202. In addition, the protruding parts 241 are connected to the side plate 22 through the fixing parts 242. In an embodiment, as shown in FIG. 4 and FIG. 5, a plurality of the protruding part 241 and a plurality of fixing parts 242 are provided, one of the protruding parts 241 is connected to the side plate 22 through one of the fixing parts 242. And the protruding parts 241 are arranged on the bottom plate 21, that is, the protruding parts 241 are also connected to the bottom plate 21. It can not only improve installation strength of the supporting protrusions 24, but also increase the contact area between the current collecting disk 3 and the supporting protrusions 24 under this setting, so that the supporting protrusions 24 can stably support the current collecting disk 3.

In an embodiment, a plurality of protruding part 241 are evenly spaced along circumference of the bottom plate 21. Each of the fixing parts 242 is connected to a same position of a corresponding protruding part 241. However, in other embodiments, only the protruding parts 241 can be connected to the side plate 22 through the fixing parts 242, and the protruding parts 241 are not directly disposed on the bottom plate 21. In addition, in other embodiments, only the protruding parts 241 may be connected with the bottom plate 21 without providing the fixing parts 242.

In an embodiment, an avoidance part 221 is provided on the side plate 22. The fuse structure 32 passes through the avoidance part 221 and extends into the limiting space 202. The avoidance part 221 is a notch provided on the side plate 22. A height of the notch is consistent with a height of the side plate 22, so that the fuse structure 32 of the current collecting disk 3 can be stably placed on the lower plastic 2 when the current collecting disk 3 is injection molded. Furthermore, the current collecting disk main body 31 can also be folded and placed in the accommodating space 201 by bending the fuse structure 32. Optionally, a liquid injecting hole 212 is defined on the bottom plate 21. The current collecting disk 3 is located in the accommodating space 201 and does not block the liquid injecting hole 212. The current collecting disk main body 31 is defined with the notch to block the liquid injecting hole 212.

In an embodiment, there are two groups of supporting protrusions 24, the two groups of supporting protrusions 24 are respectively located on both sides of the avoidance part 221. When assembling, the fuse structure 32 passes through avoidance part 221 and the two groups of supporting protrusions 24 therebetween successively, and then inserted into the adapting part 23, so as to reduce space between the two groups of supporting protrusions 24

It can be seen from the foregoing that in an embodiment, a plurality of the protruding parts 241 and the fixing parts 242 connected to each other are divided into the two groups of supporting protrusions 24 to facilitate insertion of fuse structure 32. Each of the protruding parts 241 and one of the fixing parts 242 connected to each other are defined as a supporting sub-protrusion. Intervals between a plurality of supporting sub-protrusions of each of the two groups of supporting protrusions 24 can be kept consistent. The intervals between the supporting sub-protrusions can be smaller than an interval between two groups of supporting protrusions 24. The plurality of supporting sub-protrusions arranged at intervals can also have effect of strengthening strength of the lower plastic 2.

In an embodiment, a connecting hole 211 is also defined on the bottom plate 21. The first part 321 of the fuse structure 32 is provided with a connecting protrusion 3211. The fuse structure 32 is attached to the bottom plate 21 so that the connecting protrusion 3211 on the first part321 can pass through the connecting hole 211 to connect with the top lid 1. Optionally, the connection protrusion 3211 is welded to the top cover 1. the connecting protrusion 3211 may be flush with or exceed a surface of the lower plastic 2 near the top cover 1 to facilitate welding. For the lower plastic 2 with the adapting part 23, the fuse structure 32 of the current collecting disk 3 and the adapting part 23 are connected as a whole through the injection molding process, then the connecting protrusion 3211 on the fuse structure 32 is welded to the top lid 1, and the lower plastic 2 and the top lid 1 are fixed by means of hot-melt columns. For the lower plastic 2 without the adapting part 23, only the current collecting disk 3 and the top lid 1 are connected by welding, so that the lower plastic 2 and the top lid 1 are thermally fixed to ensure mutual connection of the adapting part 23, the lower plastic 2 and the top lid 1.

A battery is also provided in an embodiment, includes a housing with an opening defined on at least at one end, a battery cell accommodated in the housing, and the above-mentioned lid plate. The lid plate is configured to seal the opening of the housing, and the battery cell is connected with the current collecting disk 3 in the lid plate. The battery can effectively avoid a problem of adhesion of the fuse structure 32 after fusing, thereby ensuring the safe in use of the battery.

What is claimed is:

1. A lid plate, comprising:
a top lid;
a lower plastic, wherein the lower plastic is stacked with the top lid, an accommodating space is defined on a side of the lower plastic away from the top lid, supporting protrusions are arranged in the accommodating space, and the supporting protrusions are configured to define a limiting space; and
a current collecting disk located in the accommodating space, wherein the current collecting disk comprises a current collecting disk main body and a fuse structure, the fuse structure comprises a first part and a second part, the first part and the second part are both located in the limiting space, the first part is electrically connected to the top lid through the lower plastic, the second part is connected to the current collecting disk main body, the current collecting disk main body is located outside the limiting space and abuts against the supporting protrusions, and the first part, the second part and the current collecting disk main body are spaced apart from each other along a height direction of the supporting protrusions;
wherein the lower plastic comprises an adapting part, the adapting part is located in the limiting space, and the first part is inserted into the adapting part;
wherein a height of the limiting space is defined as a, a sum of thicknesses of the first part and the second part is defined as b along a thickness direction of the lower plastic, a sum of thicknesses of the first part, the second part, and the adapting part between the first part and the second part is defined as c along the thickness direction of the lower plastic, and a>2b>c.

2. The lid plate of claim 1, wherein the adapting part is injection molded separately from the lower plastic.

3. The lid plate of claim 1, wherein the lower plastic comprises a bottom plate and a side plate, the side plate is arranged around a circumference of the bottom plate to define the accommodating space, and the supporting protrusions are connected to at least one of the bottom plate and the side plate.

4. The lid plate of claim 3, wherein the supporting protrusions comprise protruding parts and fixing parts, the protruding parts and the bottom plate are configured to define the limiting space, and the protruding parts are connected to the side plate through the fixing parts.

5. The lid plate of claim 3, wherein the side plate is provided with an avoidance part, and the fuse structure passes through the avoidance part and extends into the limiting space.

6. The lid plate of claim 5, wherein the supporting protrusions comprise two groups, two groups of supporting protrusions are respectively located on both sides of the avoidance part, and the fuse structure is located between the two groups of supporting protrusions.

7. The lid plate of claim 6, wherein each group of the two groups of supporting protrusions comprises a plurality of supporting sub-protrusions, and the plurality of supporting sub-protrusions are arranged at intervals along a circumferential direction of the bottom plate.

8. The lid plate of claim 3, wherein a connecting hole is defined on the bottom plate, the first part is provided with a connecting protrusion, and the connecting protrusion is inserted into the connecting hole and welded to the top lid.

9. The lid plate of claim 1, wherein the fuse structure further comprises a bendable part, and the first part and the second part are bently connected through the bendable part.

10. The lid plate of claim 1, wherein the adapting part is injection molded separately from the lower plastic; and
the fuse structure further comprises a bendable part, and the first part and the second part are bently connected through the bendable part.

11. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate; and
the fuse structure further comprises a bendable part, and the first part and the second part are bently connected through the bendable part.

12. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate;
the supporting protrusions comprise protruding parts and fixing parts, the protruding parts and the bottom plate are configured to define the limiting space, and the protruding parts are connected to the side plate through the fixing parts; and
the fuse structure further comprises a bendable part, and the first part and the second part are bently connected through the bendable part.

13. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate;
the side plate is provided with an avoidance part, and the fuse structure passes through the avoidance part and extends into the limiting space; and
the fuse structure further comprises a bendable part, and the first part and the second part are bently connected through the bendable part.

14. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate;

the side plate is provided with an avoidance part, and the fuse structure passes through the avoidance part and extends into the limiting space;

the supporting protrusions comprise two groups, two groups of supporting protrusions are respectively located on both sides of the avoidance part, and the fuse structure is located between the two groups of supporting protrusions; and the fuse structure further comprises a bendable part, and the first part and the second part are bently connected through the bendable part.

15. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate;

the side plate is provided with an avoidance part, and the fuse structure passes through the avoidance part and extends into the limiting space;

the supporting protrusions comprise two groups, two groups of supporting protrusions are respectively located on both sides of the avoidance part, and the fuse structure is located between the two groups of supporting protrusions;

each group of the two groups of supporting protrusions comprises a plurality of supporting sub-protrusions, and the plurality of supporting sub-protrusions are arranged at intervals along a circumferential direction of the bottom plate; and the fuse structure further comprises a bendable part, and the first part and the second part are bently connected through the bendable part.

16. The lid plate of claim 1, the lower plastic comprises a bottom plate and a side plate, the side plate is arranged around a circumference of the bottom plate to define the accommodating space, and the supporting protrusions are connected to at least one of the bottom plate and the side plate; and a connecting hole is defined on the bottom plate, the first part is provided with a connecting protrusion, and the connecting protrusion is inserted into the connecting hole and welded to the top lid.

17. A battery, comprising a housing with an opening defined on at least one end, battery cells accommodated in the housing, and a lid plate;

wherein the lid plate is configured to seal the opening of the housing, and the battery cells are connected with the current collecting disk in the lid plate, the lid plate comprises:

a top lid;

a lower plastic, wherein the lower plastic is stacked with the top lid, an accommodating space is defined on a side of the lower plastic away from the top lid, supporting protrusions are arranged in the accommodating space, and the supporting protrusions are configured to define a limiting space; and a current collecting disk located in the accommodating space, wherein the current collecting disk comprises a current collecting disk main body and a fuse structure, the fuse structure comprises a first part and a second part, the first part and the second part are both located in the limiting space, the first part is electrically connected to the top lid through the lower plastic, the second part is connected to the current collecting disk main body, the current collecting disk main body is located outside the limiting space and abuts against the supporting protrusions, and the first part, the second part and the current collecting disk main body are spaced apart from each other along a height direction of the supporting protrusions;

wherein the lower plastic comprises an adapting part, the adapting part is located in the limiting space, and the first part is inserted into the adapting part;

wherein a height of the limiting space is defined as a, and a sum of thicknesses of the first part and the second part is defined as b along a thickness direction of the lower plastic, a sum of thicknesses of the first part, the second part, and the adapting part between the first part and the second part is defined as c along the thickness direction of the lower plastic, and $a > 2b > c$.

* * * * *